(12) United States Patent
Akimoto (10) Patent No.: US 7,949,462 B2
(45) Date of Patent: May 24, 2011

(54) INTERNAL COMBUSTION ENGINE SYSTEM, CONTROL METHOD THEREOF, AND VEHICLE

(75) Inventor: Hikokazu Akimoto, Aichi-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 12/988,970

(22) PCT Filed: Jan. 16, 2009

(86) PCT No.: PCT/JP2009/050539
§ 371 (c)(1),
(2), (4) Date: Oct. 21, 2010

(87) PCT Pub. No.: WO2009/150859
PCT Pub. Date: Dec. 17, 2009

(65) Prior Publication Data
US 2011/0036074 A1 Feb. 17, 2011

(30) Foreign Application Priority Data

Jun. 11, 2008 (JP) ................. 2008-153302

(51) Int. Cl.
*G06F 19/00* (2006.01)
*F02D 41/04* (2006.01)
*F02D 41/22* (2006.01)
*F02D 43/00* (2006.01)
*F02M 25/07* (2006.01)
*F02B 47/08* (2006.01)
*F01N 3/24* (2006.01)

(52) U.S. Cl. .......... 701/114; 701/104; 701/108; 60/277; 60/278; 60/285

(58) Field of Classification Search .................. 123/299, 123/300, 305, 78, 480, 492, 568.11, 568.16, 123/568.21; 701/29, 31, 33, 101–105, 108, 701/114, 115, 182–185; 60/274, 276–279, 60/285, 299, 311; 73/114.69, 114.74, 114.75
See application file for complete search history.

(56) References Cited

U.S. PATENT DOCUMENTS

| | | | | |
|---|---|---|---|---|
| 5,014,203 A | * | 5/1991 | Miyazaki et al. | 701/108 |
| 5,979,160 A | * | 11/1999 | Yashiki et al. | 60/277 |
| 6,701,232 B2 | * | 3/2004 | Yamaki | 701/33 |
| 7,150,144 B2 | * | 12/2006 | Nakagawa et al. | 60/277 |
| 7,716,920 B2 | * | 5/2010 | Onodera et al. | 60/285 |

(Continued)

FOREIGN PATENT DOCUMENTS

JP        06058197 A  *  3/1994  ................. 701/108

(Continued)

*Primary Examiner* — Willis R Wolfe, Jr.
(74) *Attorney, Agent, or Firm* — Kenyon & Kenyon LLP (57) ABSTRACT

Upon no detection of the closing abnormality where the EGR valve does not become in the totally closed state (when the flag Fa is value '0'), the engine is controlled using the target fuel injection amount obtained from the correction of the basic fuel injection amount toward the increase direction, in the case that the engine is operated together with the recirculation of the exhaust in the preset high-load operation range (when the flag Fi is '1'). Upon detection of the closing abnormality (when the flag Fa is value '1'), the engine is controlled using the target fuel injection amount obtained from the correction of the basic fuel injection amount toward the increase direction, in the case that the engine is operated together with the recirculation of the exhaust in the whole range that the engine is operable together with the recirculation of the exhaust.

7 Claims, 5 Drawing Sheets

U.S. PATENT DOCUMENTS

2008/0256929 A1 * 10/2008 Sugimoto .................. 60/278

FOREIGN PATENT DOCUMENTS

| | | |
|---|---|---|
| JP | 2001-164999 A | 6/2001 |
| JP | 2001-349231 A | 12/2001 |
| JP | 2002-4901 A | 1/2002 |
| JP | 2004-353580 A | 12/2004 |
| JP | 2008-267261 A | 11/2008 |

* cited by examiner

INTERNAL COMBUSTION ENGINE SYSTEM, CONTROL METHOD THEREOF, AND VEHICLE

This is a 371 national phase application of PCT/JP2009/050539 filed 16 Jan. 2009, claiming priority to Japanese Patent Application No. JP 2008-153302 filed 11 Jun. 2008, the contents of which are incorporated herein by reference.

TECHNICAL FIELD

The present invention relates to an internal combustion engine system and a control method thereof. More specifically, the invention pertains to an internal combustion engine system having an internal combustion engine, an exhaust gas recirculation unit including an exhaust regulating valve that regulates a recirculation amount of exhaust of the internal combustion engine into an intake system of the internal combustion engine and a driver that drives the exhaust regulating valve to be open and close, and an exhaust purification unit including an exhaust purifying catalyst that purifies the exhaust of the internal combustion engine, and a control method of the internal combustion engine system.

BACKGROUND ART

In one proposed internal combustion engine system, the fuel supply amount is corrected to be larger against the smaller differential pressure between the pressure in an air intake conduit while opening an exhaust recirculation valve and the pressure in the air intake conduit while closing the exhaust recirculation valve (see, for example, Patent Document 1). In this system, it is determined that the degree of clogging in an exhaust gas recirculation conduit or the exhaust gas recirculation valve becomes more against the smaller differential pressure between the pressure in the air intake conduit while opening the exhaust recirculation valve and the pressure in the air intake conduit while closing the exhaust recirculation valve, and determined that the air-fuel ratio is increased. In this system, the fuel supply amount is corrected to be larger and emissions of nitrogen oxides (NOx) are reduced.

Patent Document 1: Japanese Patent Laid-Open No. 2001-349231

DISCLOSURE OF THE INVENTION

In internal combustion engine systems having such an exhaust gas recirculation device, when the internal combustion engine is operated together with the recirculation of exhaust gas at an operation point of a relatively high torque, a fuel increase correction is performed to prevent that the catalyst of an exhaust purification device attached to the exhaust system of the internal combustion engine is overheated. In the case that it is disabled to determine the degree of opening of the exhaust recirculation valve due to foreign matter such as soot adhering to the exhaust recirculation valve, lack of the recirculation amount occurs and there happens a case that the catalyst is unexpectedly overheated, resulting that the exhaust emission is worsened.

In the internal combustion engine system and a control method of the internal combustion engine system of the invention, the main object of the invention is to prevent that a catalyst of an exhaust purifying unit is overheated regardless of occurrence of a closing abnormality that an exhaust regulating valve does not become in a totally closed state.

In order to attain the main object, the internal combustion engine system and the control method of the internal combustion engine system of the invention have the configurations discussed below.

According to one aspect, the present invention is directed to an internal combustion engine system. The internal combustion engine system, having an internal combustion engine, an exhaust gas recirculation unit including an exhaust regulating valve that regulates a recirculation amount of exhaust of the internal combustion engine into an intake system of the internal combustion engine and a valve driver that drives the exhaust regulating valve to be open and close, and an exhaust purification unit including an exhaust purifying catalyst that purifies the exhaust of the internal combustion engine, the internal combustion engine system has: a closing abnormality detection module that detects a closing abnormality that the exhaust regulating valve does not become in a totally closed state; and a control module that controls the internal combustion engine, upon no detection of the closing abnormality by the closing abnormality detection module, so that the internal combustion engine is operated with fuel injection where a fuel increase is performed to prevent that the exhaust purifying catalyst is overheated, in a case that the internal combustion engine is operated together with recirculation of the exhaust in a high-load operation range that is a range of rotation speeds more than or equal to a preset rotation speed and torques more than or equal to a preset torque, upon detection of the closing abnormality by the closing abnormality detection module, the control module controlling the internal combustion engine so that the internal combustion engine is operated with the fuel injection where the fuel increase is performed to prevent that the exhaust purifying catalyst is overheated, in a case that the internal combustion engine is operated together with the recirculation of the exhaust in a preset range that is a larger range than the high-load operation range.

The internal combustion engine system according to this aspect of the invention, upon no detection of a closing abnormality that the exhaust regulating valve does not become in a totally closed state, controls the internal combustion engine so that the internal combustion engine is operated with fuel injection where a fuel increase is performed to prevent that the exhaust purifying catalyst is overheated, in a case that the internal combustion engine is operated together with recirculation of the exhaust in a high-load operation range that is a range of rotation speeds more than or equal to a preset rotation speed and torques more than or equal to a preset torque, upon detection of the closing abnormality controlling the internal combustion engine so that the internal combustion engine is operated with the fuel injection where the fuel increase is performed to prevent that the exhaust purifying catalyst is overheated, in a case that the internal combustion engine is operated together with the recirculation of the exhaust in a preset range that is a larger range than the high-load operation range. This arrangement effectively prevents that the catalyst is unexpectedly overheated even when lack of the recirculation amount occurs. It is thus prevented that the exhaust emission is worsened.

In one preferable application of the internal combustion engine system of the invention, the valve driver may be a stepper motor, and the closing abnormality detection module may detect the closing abnormality when a step angle of the stepper motor is not a step angle corresponding to the totally closed state of the exhaust regulating valve regardless of an instruction to totally close the exhaust regulating valve, or when the step angle of the stepper motor is not opened more from the step angle corresponding to the totally closed state of the exhaust regulating valve regardless of an instruction to open the exhaust regulating valve from the totally closed state. This arrangement enables to detect the closing abnormality more adequately based on the step angle of the stepper motor.

In another preferable application of the internal combustion engine system of the invention, the preset range may be a whole range that the internal combustion engine is operable while the internal combustion engine is operated together with the recirculation of the exhaust. This arrangement more certainly prevents unexpected overheating of the catalyst.

According to another aspect, the present invention is directed to a vehicle equipped with any of the above arrangements of the internal combustion engine system, the vehicle being driven with power from the internal combustion engine. Here the internal combustion engine system having an internal combustion engine, an exhaust gas recirculation unit including an exhaust regulating valve that regulates a recirculation amount of exhaust of the internal combustion engine into an intake system of the internal combustion engine and a valve driver that drives the exhaust regulating valve to be open and close, and an exhaust purification unit including an exhaust purifying catalyst that purifies the exhaust of the internal combustion engine, fundamentally has: a closing abnormality detection module that detects a closing abnormality that the exhaust regulating valve does not become in a totally closed state; and a control module that controls the internal combustion engine, upon no detection of the closing abnormality by the closing abnormality detection module, so that the internal combustion engine is operated with fuel injection where a fuel increase is performed to prevent that the exhaust purifying catalyst is overheated, in a case that the internal combustion engine is operated together with recirculation of the exhaust in a high-load operation range that is a range of rotation speeds more than or equal to a preset rotation speed and torques more than or equal to a preset torque, upon detection of the closing abnormality by the closing abnormality detection module, the control module controlling the internal combustion engine so that the internal combustion engine is operated with the fuel injection where the fuel increase is performed to prevent that the exhaust purifying catalyst is overheated, in a case that the internal combustion engine is operated together with the recirculation of the exhaust in a preset range that is a larger range than the high-load operation range.

The vehicle according to this aspect of the invention has any of the above arrangements of the internal combustion engine system. The vehicle thus has at least part of effects that the internal combustion engine system of the invention has such as an effect of effectively preventing that the catalyst is unexpectedly overheated regardless of when lack of the recirculation amount occurs.

According to still another aspect, the present invention is directed to a control method of an internal combustion engine system having an internal combustion engine, an exhaust gas recirculation unit including an exhaust regulating valve that regulates a recirculation amount of exhaust of the internal combustion engine into an intake system of the internal combustion engine and a valve driver that drives the exhaust regulating valve to be open and close, and an exhaust purification unit including an exhaust purifying catalyst that purifies the exhaust of the internal combustion engine. The control method of the internal combustion engine system includes: upon no occurrence of a closing abnormality that the exhaust regulating valve does not become in a totally closed state, controlling the internal combustion engine so that the internal combustion engine is operated with fuel injection where a fuel increase is performed to prevent that the exhaust purifying catalyst is overheated, in a case that the internal combustion engine is operated together with recirculation of the exhaust in a high-load operation range that is a range of rotation speeds more than or equal to a preset rotation speed and torques more than or equal to a preset torque, upon occurrence of the closing abnormality controlling the internal combustion engine so that the internal combustion engine is operated with the fuel injection where the fuel increase is performed to prevent that the exhaust purifying catalyst is overheated, in a case that the internal combustion engine is operated together with the recirculation of the exhaust in a preset range that is a larger range than the high-load operation range.

The control method of the internal combustion engine system according to this aspect of the invention, upon no detection of a closing abnormality that the exhaust regulating valve does not become in a totally closed state, controls the internal combustion engine so that the internal combustion engine is operated with fuel injection where a fuel increase is performed to prevent that the exhaust purifying catalyst is overheated, in a case that the internal combustion engine is operated together with recirculation of the exhaust in a high-load operation range that is a range of rotation speeds more than or equal to a preset rotation speed and torques more than or equal to a preset torque, upon detection of the closing abnormality controlling the internal combustion engine so that the internal combustion engine is operated with the fuel injection where the fuel increase is performed to prevent that the exhaust purifying catalyst is overheated, in a case that the internal combustion engine is operated together with the recirculation of the exhaust in a preset range that is a larger range than the high-load operation range. This arrangement effectively prevents that the catalyst is unexpectedly overheated even when lack of the recirculation amount occurs. It is thus prevented that the exhaust emission is worsened.

BEST MODES OF CARRYING OUT THE INVENTION

Figure 1:
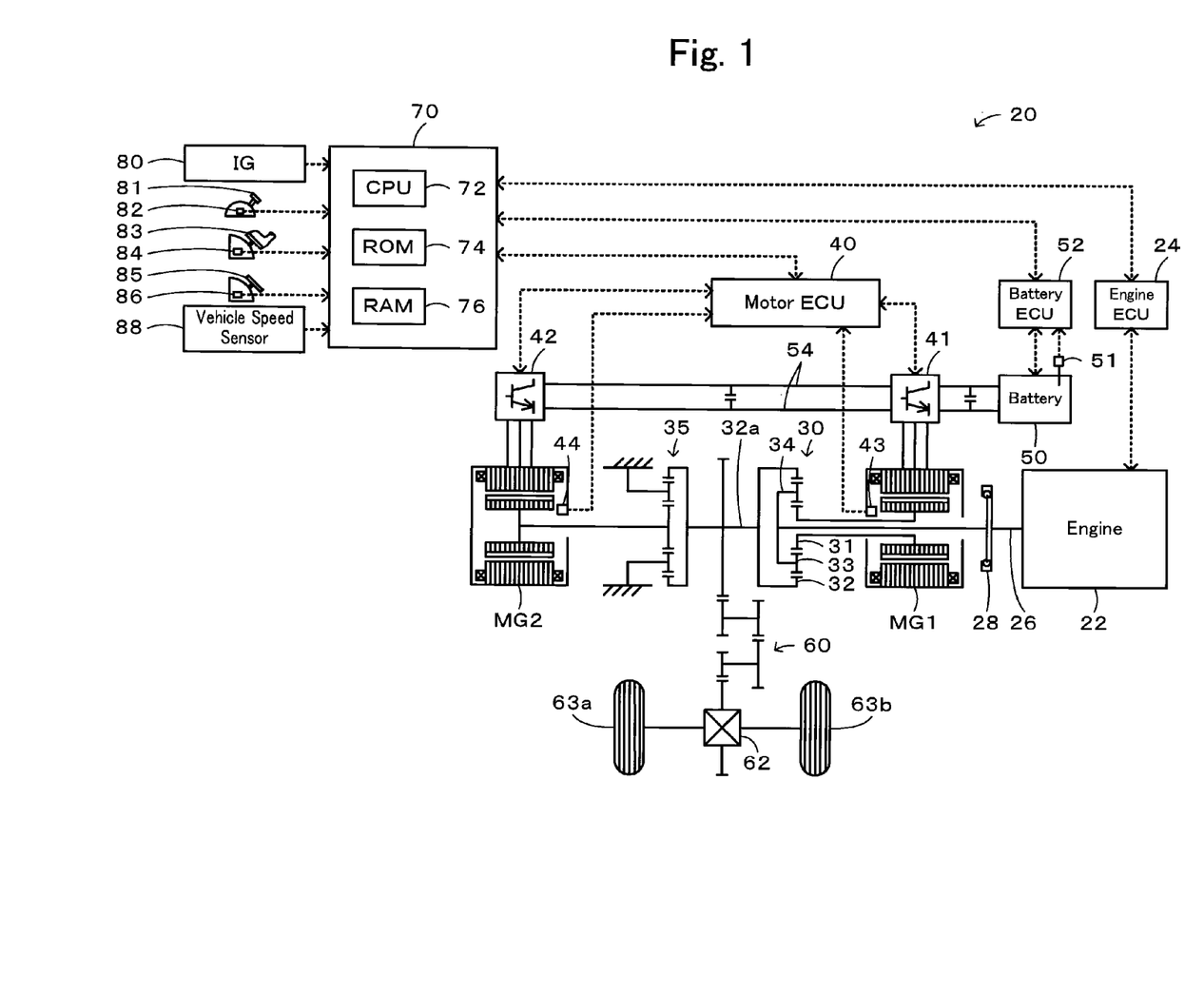
FIG. 1 schematically illustrates the configuration of a hybrid vehicle 20 in one embodiment of the invention.

One mode of carrying out the invention is discussed below as a preferred embodiment. FIG. 1 schematically illustrates the configuration of a hybrid vehicle 20 equipped with an internal combustion engine system in one embodiment according to the invention. As illustrated, the hybrid vehicle 20 of the embodiment includes the engine 22, a three shaft-type power distribution integration mechanism 30 connected via a damper 28 to a crankshaft 26 or an output shaft of the engine 22, a motor MG1 connected to the power distribution integration mechanism 30 and designed to have power generation capability, a reduction gear 35 attached to a ring gear shaft 32a or a driveshaft linked with the power distribution integration mechanism 30, a motor MG2 connected to the reduction gear 35, and a hybrid electronic control unit 70 configured to control the operations of the whole hybrid vehicle 20.

Figure 2:
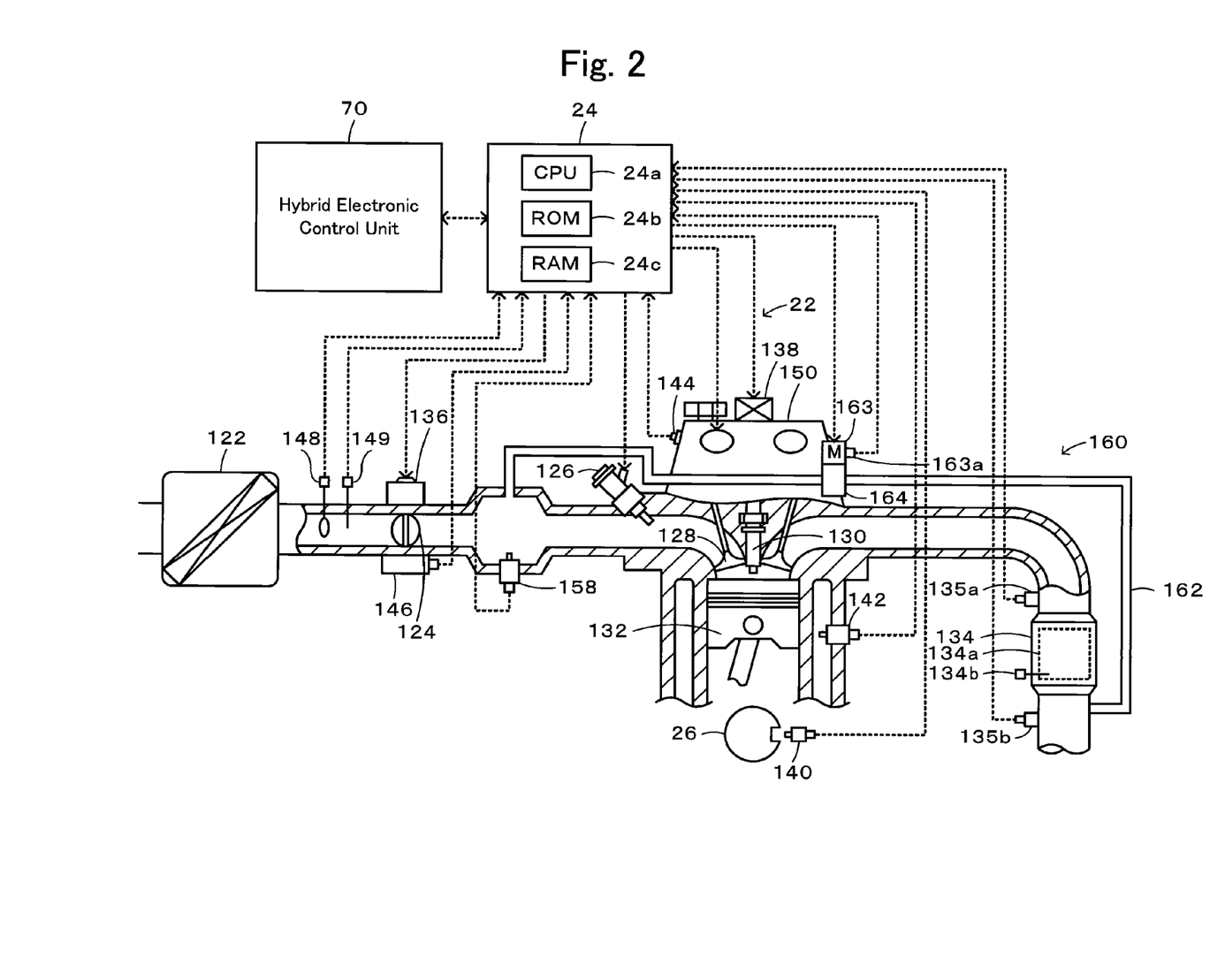
FIG. 2 is a schematic view showing the structure of an engine 22.

The engine 22 is an internal combustion engine that consumes a hydrocarbon fuel, such as gasoline or light oil, to output power. As shown in FIG. 2, the air cleaned by an air cleaner 122 and taken into an air intake conduit via a throttle valve 124 is mixed with the atomized fuel injected from a fuel injection valve 126 to the air-fuel mixture. The air-fuel mixture is introduced into a combustion chamber by means of an intake valve 128. The introduced air-fuel mixture is ignited with spark made by a spark plug 130 to be explosively combusted. The reciprocating motions of a piston 132 pressed down by the combustion energy are converted into rotational motions of the crankshaft 26. The exhaust from the engine 22 goes through a catalytic converter 134 having a purifying catalyst (three-way catalyst) 134a to convert toxic components included in the exhaust, that is, carbon monoxide (CO), hydrocarbons (HC), and nitrogen oxides (NOx), into harmless components, and is discharged to the outside air or supplied to an air intake system via an EGR (Exhaust Gas Recirculation) system 160. The EGR system 160 has an EGR pipe 162 connected downstream of the catalytic converter 134 to supply the exhaust into a surge tank of the air intake system, and an EGR valve 164 located at the EGR pipe 162 and driven by a stepper motor 163. The EGR system 160 is constructed to supply the exhaust as the uncombusted gas to the air intake system controlling the supply amount by regulating the opening degree of the EGR valve 164. In the structure of the engine 22, the intake air mixed with the exhaust is further mixed with the atomized fuel to the air-fuel mixture, which is introduced into the combustion chamber.

The engine 22 is under control of an engine electronic control unit (hereafter referred to as engine ECU) 24. The engine ECU 24 is constructed as a microprocessor including a CPU 24a, a ROM 24b configured to store processing programs, a RAM 24c configured to temporarily store data, input and output ports (not shown), and a communication port (not shown). The engine ECU 24 receives, via its input port, signals from various sensors designed to measure and detect the operating conditions of the engine 22. The signals input into the engine ECU 24 include a crank position from a crank position sensor 140 detected as the rotational position of the crankshaft 26, a cooling water temperature Tw from a water temperature sensor 142 measured as the temperature of cooling water in the engine 22, an in-cylinder pressure from a non-illustrated pressure sensor located inside the combustion chamber, cam positions from a cam position sensor 144 detected as the rotational positions of camshafts driven to open and close the intake valve 128 and an exhaust valve for gas intake and exhaust into and from the combustion chamber, a throttle position from a throttle valve position sensor 146 detected as the position of the throttle valve 124, an intake air amount Qa from an air flow meter 148 located in the air intake conduit measured as a rate of mass flow of the intake air, an intake air temperature from a temperature sensor 149 located in the air intake conduit, an intake air pressure from an intake air pressure sensor 158 detected as the pressure inside the air intake conduit, an air-fuel ratio from the air-fuel ratio sensor 135a, an oxygen signal from the oxygen sensor 135b, a catalyst temperature from a temperature sensor 134b measured as the temperature of the purifying catalyst 134a, and a step angle θ from a step angle sensor 163a detected as a step angle of the stepper motor 163. The engine ECU 24 outputs, via its output port, diverse control signals and driving signals to drive and control the engine 22. The signals output from the engine ECU 24 include driving signals to the fuel injection valve 126, driving signals to a throttle valve motor 136 driven to regulate the position of the throttle valve 124, control signals to an ignition coil 138 integrated with an igniter, control signals to a variable valve timing mechanism 150 to vary the open and close timings of the intake valve 128, and driving signals to the stepper motor 163 driven to regulate the opening degree of the EGR valve 164. The engine ECU 24 establishes communication with the hybrid electronic control unit 70 to drive and control the engine 22 in response to control signals received from the hybrid electronic control unit 70 and to output data regarding the operating conditions of the engine 22 to the hybrid electronic control unit 70 according to the requirements. The engine ECU 24 also performs several arithmetic operations to compute a rotation speed of the crankshaft 26 or a rotation speed Ne of the engine 22 from the crank position input from the crank position sensor 140.

The power distribution integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution integration mechanism 30 are respectively coupled with the crankshaft 26 of the engine 22, the motor MG1, and the reduction gear 35 via ring gear shaft 32a. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the driving wheels 63a and 63b via the gear mechanism 60, and the differential gear 62 from ring gear shaft 32a.

Both the motors MG1 and MG2 are known synchronous motor generators that are driven as a generator and as a motor. The motors MG1 and MG2 transmit electric power to and from a battery 50 via inverters 41 and 42. Power lines 54 that connect the inverters 41 and 42 with the battery 50 are constructed as a positive electrode bus line and a negative electrode bus line shared by the inverters 41 and 42. This arrangement enables the electric power generated by one of the motors MG1 and MG2 to be consumed by the other motor. The battery 50 is charged with a surplus of the electric power generated by the motor MG1 or MG2 and is discharged to supplement an insufficiency of the electric power. When the power balance is attained between the motors MG1 and MG2, the battery 50 is neither charged nor discharged. Operations of both the motors MG1 and MG2 are controlled by a motor electronic control unit (hereafter referred to as motor ECU) 40. The motor ECU 40 receives diverse signals required for controlling the operations of the motors MG1 and MG2, for example, signals from rotational position detection sensors 43 and 44 that detect the rotational positions of rotors in the motors MG1 and MG2 and phase currents applied to the motors MG1 and MG2 and measured by current sensors (not shown). The motor ECU 40 outputs switching control signals to the inverters 41 and 42. The motor ECU 40 communicates with the hybrid electronic control unit 70 to control operations of the motors MG1 and MG2 in response to control signals transmitted from the hybrid electronic control unit 70 while outputting data relating to the operating conditions of the motors MG1 and MG2 to the hybrid electronic control unit 70 according to the requirements. The motor ECU 40 also performs arithmetic operations to compute rotation speeds Nm1 and Nm2 of the motors MG1 and MG2 from the output signals of the rotational position detection sensors 43 and 44.

The battery 50 is under control of a battery electronic control unit (hereafter referred to as battery ECU) 52. The battery ECU 52 receives diverse signals required for control of the battery 50, for example, an inter-terminal voltage measured by a voltage sensor (not shown) disposed between terminals of the battery 50, a charge-discharge current measured by a current sensor (not shown) attached to the power line 54 connected with the output terminal of the battery 50, and a battery temperature Tb measured by a temperature sensor 51 attached to the battery 50. The battery ECU 52 outputs data relating to the state of the battery 50 to the hybrid electronic control unit 70 via communication according to the requirements. The battery ECU 52 also performs various arithmetic operations for management and control of the battery 50. A remaining charge or state of charge (SOC) of the battery 50 is calculated from an integrated value of the charge-discharge current measured by the current sensor. An input limit Win as a maximum allowable charging electric power to be charged in the battery 50 and an output limit Wout as a maximum allowable discharging electric power to be discharged from the battery 50 are set corresponding to the calculated state of charge (SOC) and the battery temperature Tb. A concrete procedure of setting the input and output limits Win and Wout of the battery 50 sets base values of the input limit Win and the output limit Wout corresponding to the battery temperature Tb, specifies an input limit correction factor and an output limit correction factor corresponding to the state of charge (SOC) of the battery 50, and multiplies the base values of the input limit Win and the output limit Wout by the specified input limit correction factor and output limit correction factor to determine the input limit Win and the output limit Wout of the battery 50.

The hybrid electronic control unit 70 is constructed as a microprocessor including a CPU 72, a ROM 74 that stores processing programs, a RAM 76 that temporarily stores data, and a non-illustrated input-output port, and a non-illustrated communication port. The hybrid electronic control unit 70 receives various inputs via the input port: an ignition signal from an ignition switch 80, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, and a vehicle speed V from a vehicle speed sensor 88. The hybrid electronic control unit 70 communicates with the engine ECU 24, the motor ECU 40, and the battery ECU 52 via the communication port to transmit diverse control signals and data to and from the engine ECU 24, the motor ECU 40, and the battery ECU 52, as mentioned previously. In the hybrid vehicle 20 of the embodiment, the gearshift position sensor 82 detects one of several gearshift positions such as a parking position (P position), a neutral position (N position), a drive position (D position), and a reverse position (R position) as the gearshift position SP.

The hybrid vehicle 20 of the embodiment thus constructed calculates a torque demand to be output to the ring gear shaft 32a functioning as the drive shaft, based on observed values of a vehicle speed V and an accelerator opening Acc, which corresponds to a driver's step-on amount of the accelerator pedal 83. The engine 22 and the motors MG1 and MG2 are subjected to operation control to output a required level of power corresponding to the calculated torque demand to the ring gear shaft 32a. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32a. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32a, simultaneously with charge or discharge of the battery 50. The motor drive mode stops the operations of the engine 22 and drives and controls the motor MG2 to output a quantity of power equivalent to the required level of power to the ring gear shaft 32a. Both of the torque conversion drive mode and the charge-discharge drive mode are modes for controlling the engine 22 and the motors MG1 and MG2 to output the required level of power to the ring gear shaft 32a with operation of the engine 22 and the control in the both modes practically has no difference. A combination of the both modes is thus referred to as an engine load operation mode hereafter.

Figure 3:
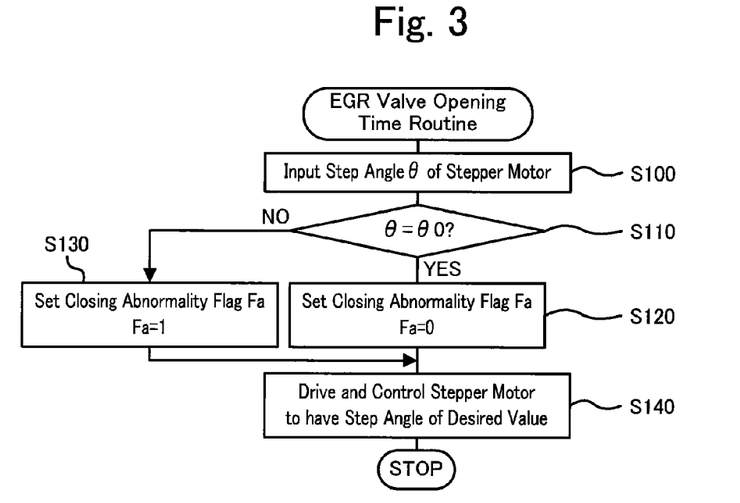
FIG. 3 is a flowchart showing an EGR valve opening time routine executed by an engine ECU 24 in the embodiment.

The description regards the operations of the internal combustion engine system installed in the hybrid vehicle 20 of the embodiment having the configuration discussed above. The combination of the engine 22, the catalytic converter 134, the EGR system 160, and the engine ECU 24 primarily corresponds to the internal combustion engine system in the embodiment. FIG. 3 is a flowchart showing an EGR valve opening time routine executed by the engine ECU 24. This routine is executed when it is instructed by the hybrid electronic control unit 70 to open the EGR valve 164 from its totally closed state.

In the EGR valve opening time routine, the CPU 24a of the engine ECU 24 inputs the step angle θ of the stepper motor 163 from the step angle sensor 163a (step S100), and determines whether the input step angle θ is equal to a preset angle θ0 that corresponds to the totally closed state of the EGR valve 164 (step S110). There is a case that an closing abnormality where the EGR valve 164 does not become in the totally closed state occurs when foreign matter such as soot adheres to the EGR valve 164. The processing of step S110 is the processing to detect this closing abnormality when the step angle θ is not equal to the preset angle θ0. When the step angle θ of the stepper motor 163 is equal to the preset angle θ0 (the EGR valve 164 is in the totally closed state), the CPU 24a sets an closing abnormality detection flag Fa to value '0' (step S120). The closing abnormality detection flag Fa is set to value '0' when the closing abnormality is not detected and set to value '1' when the closing abnormality is detected. The CPU 24a then drives and controls the stepper motor 163 so that the step angle of the stepper motor 163 (the opening degree of the EGR valve 164) becomes a desired value (for example, a value set based on the intake air amount Qa and the rotation speed Ne of the engine 22) (step S140), and terminates the EGR valve opening time routine. When the step angle θ of the stepper motor 163 is not equal to the preset angle θ0 (the EGR valve 164 is not in the totally closed state) in the processing of step S110, the CPU 24a sets the closing abnormality detection flag Fa to value '1' (step S130). The CPU 24a then drives and controls the stepper motor 163 so that the step angle of the stepper motor 163 (the opening degree of the EGR valve 164) becomes the desired value (step S140), and terminates the EGR valve opening time routine.

Figure 4:
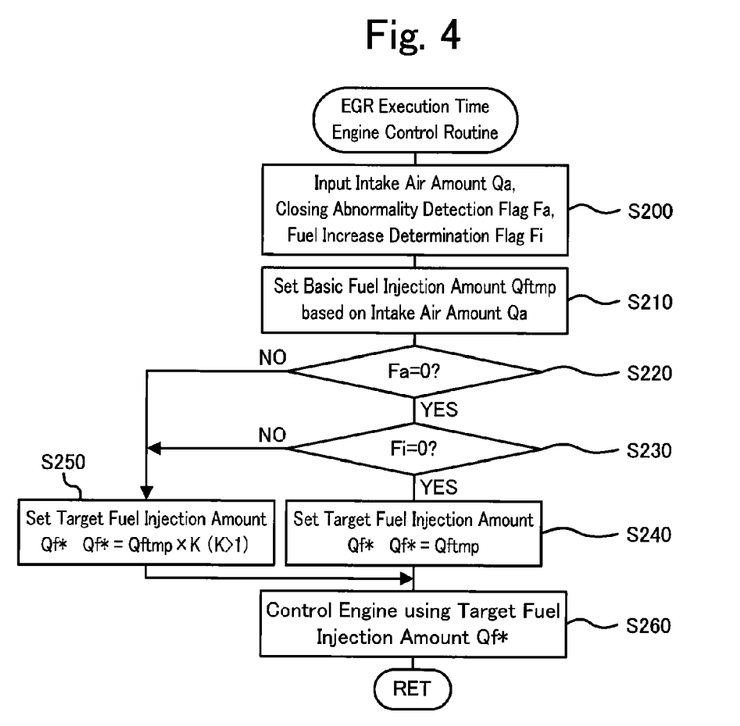
FIG. 4 is a flowchart showing an EGR execution time engine control routine executed by the engine ECU 24 in the embodiment.

Next, control of the engine 22 during execution of the EGR is explained. FIG. 4 is a flowchart showing an EGR execution time engine control routine executed by the engine ECU 24. This routine is executed repeatedly at preset time intervals (for example, at every several msec) under satisfaction of an EGR execution condition. In the embodiment, the EGR execution condition is satisfied when the cooling water temperature Tw from the water temperature sensor 142 is more than or equal to a preset temperature indicating the warm-up completion (for example, 65° C. or 70° C.) and the both of the rotation speed Ne and the intake air amount Qa of the engine 22 are within a preset range where the EGR execution is required (for example, within a range where the EGR execution is required to enhance fuel efficiency and defined by rotation speeds less than a threshold value of the rotation speed Ne and intake air amounts less than a threshold value of the intake air amount Qa, or within a range where the EGR execution is required to prevent overheating of the purifying catalyst 134a and defined by rotation speeds more than or equal to a threshold value of the rotation speed Ne or intake air amounts more than or equal to a threshold value of the intake air amount Qa).

Figure 5:
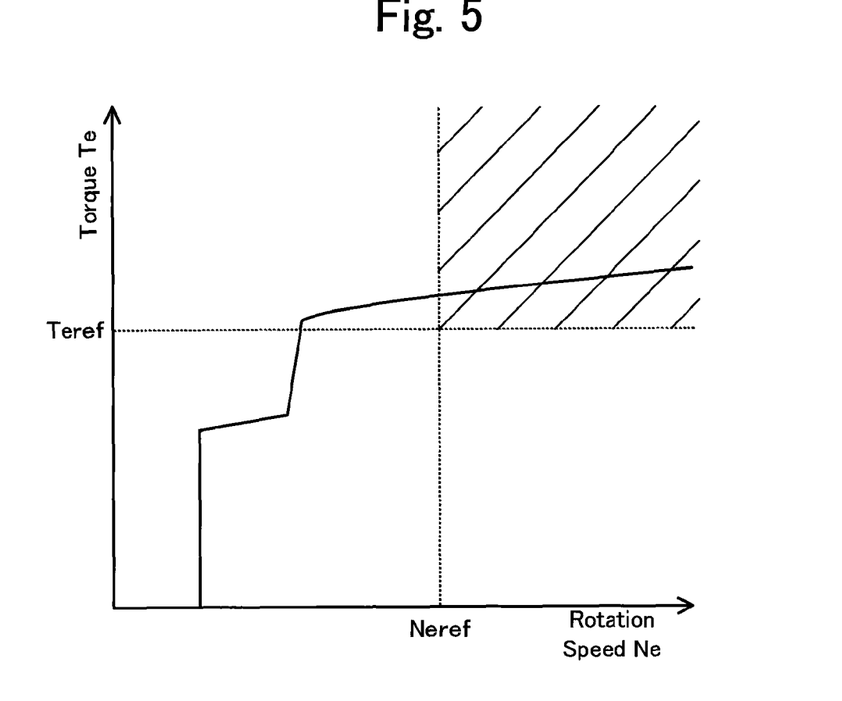
FIG. 5 shows one example of a high-load operation range where a purifying catalyst 134a has a possibility to be overheated.

In the EGR execution time engine control routine, the CPU 24a of the engine ECU 24 inputs the intake air amount Qa from the flow meter 148, the closing abnormality detection flag Fa, and a fuel increase determination flag Fi (step S200). The closing abnormality detection flag Fa is read and input from a preset address of the RAM 24c storing the setting to value '0' when the closing abnormality where the EGR valve 164 does not become in the totally closed state is not detected and to value '1' when the closing abnormality is detected in the EGR valve opening time routine of FIG. 3. The fuel increase determination flag Fi is read and input from a preset address of the RAM 24c storing the setting to value '0' when the engine 22 is not operated in a preset high-load operation range where the purifying catalyst 134a has a possibility to be overheated and to value '1' when the engine 22 is operated in the preset high-load operation range where the purifying catalyst 134a has a possibility to be overheated. FIG. 5 shows one example of the high-load operation range where the purifying catalyst 134a has a possibility to be overheated. In the embodiment, when the engine 22 is operated in the range shown as a diagonally shaded area in the figure and defined by the rotation sped Ne more than or equal to the threshold valve Neref and the output torque Te more than or equal to the threshold value Teref, it is determined that there is a possibility that the purifying catalyst 134a is overheated and the fuel increase determination flag Fi is set to value '1'.

After the data input, the CPU 24a sets a basic fuel injection amount Qftmp which makes a target air-fuel ratio (for example, a stoichiometric air-fuel ratio) according to the input intake air amount Qa (step S210). The CPU 24a subsequently determines whether the closing abnormality detection flag Fa is equal to value '0' or not (step S220). When the closing abnormality detection flag Fa is equal to value '0', that is, when the closing abnormality where the EGR valve 164 does not become in the totally closed state, the CPU 24a determines whether the fuel increase determination flag Fi is equal to value '0' or not (step S230). When the fuel increase determination flag Fi is equal to value '0', the CPU 24a sets the basic fuel injection amount Qftmp as a target fuel injection amount Qf* (step S240). When the fuel increase determination flag Fi is equal to value '1', the CPU 24a sets the product of the basic fuel injection amount Qftmp and a correction factor K larger than value '1' (Qftmp·K) as the target fuel injection amount Qf* (step S250). The CPU 24a then controls the engine 22 using the set target fuel injection amount Qf* (step S260), and terminates the EGR execution time engine control routine. In the engine 22, required control including fuel injection control using the target fuel injection amount Qf*, intake air amount control, ignition control, and open-close timing control of the intake valve 128 is performed. Overheating of the purifying catalyst 134a occurs with a higher possibility when the fuel increase determination flag Fi is equal to value '1' that is to say the engine 22 is operated in the preset high-load operation range. The engine 22 is controlled using the target fuel injection amount Qf* obtained from the correction of the basic fuel injection amount Qftmp toward the increase direction, and a ratio of the atomized fuel in the air-fuel mixture of the intake air, the exhaust, and the atomized fuel is increased to lower the combustion temperature of the air-fuel mixture. This enables to prevent the overheating of the purifying catalyst 134a.

When the closing abnormality detection flag Fa is equal to value '1' in the processing of step S220, the CPU 24a sets the product of the basic fuel injection amount Qftmp and the above correction factor K (Qftmp·K) as the target fuel injection amount Qf* (step S250). The CPU 24a controls the engine 22 using the set target fuel injection amount Qf* (step S260), and terminates the EGR execution time engine control routine. As described, the engine 22 is controlled, using the target fuel injection amount Qf* obtained from the correction of the basic fuel injection amount Qftmp toward the increase direction, in the whole range that the engine 22 is operable together with the recirculation of the exhaust. The ratio of the atomized fuel in the air-fuel mixture of the intake air, the exhaust, and the atomized fuel is increased to lower the combustion temperature of the air-fuel mixture, and it is enabled to prevent the overheating of the purifying catalyst 134a. Accordingly, it is prevented that the purifying catalyst 134a is unexpectedly overheated even when foreign matter such as soot adheres to the EGR valve 164 and lack of the recirculation amount of the exhaust occurs. It is thus effectively prevented that the exhaust emission is worsened.

In the hybrid vehicle 20 of the embodiment described above, upon no detection of the closing abnormality where the EGR valve 164 does not become in the totally closed state, the engine 22 is controlled using the target fuel injection amount Qf* obtained from the correction of the basic fuel injection amount Qftmp toward the increase direction, in the case that the engine 22 is operated together with the recirculation of the exhaust in the preset high-load operation range. Upon detection of the closing abnormality where the EGR valve 164 does not become in the totally closed state, the engine 22 is controlled using the target fuel injection amount Qf* obtained from the correction of the basic fuel injection amount Qftmp toward the increase direction, in the case that the engine 22 is operated together with the recirculation of the exhaust in the whole range that the engine 22 is operable together with the recirculation of the exhaust. Accordingly, it is prevented that the purifying catalyst 134a is unexpectedly overheated even when foreign matter such as soot adheres to the EGR valve 164 and lack of the recirculation amount of the exhaust occurs. It is thus effectively prevented that the exhaust emission is worsened.

In the hybrid vehicle 20 of the embodiment, upon detection of the closing abnormality where the EGR valve 164 does not become in the totally closed state, the engine 22 is controlled using the target fuel injection amount Qf* obtained from the correction of the basic fuel injection amount Qftmp toward the increase direction, in the case that the engine 22 is operated together with the recirculation of the exhaust in the whole range that the engine 22 is operable together with the recirculation of the exhaust. This is not essential. Upon detection of the closing abnormality, any other arrangement may be applicable such as an arrangement of controlling the engine 22 using the target fuel injection amount Qf* obtained from the correction of the basic fuel injection amount Qftmp toward the increase direction, in the case that the engine 22 is operated together with the recirculation of the exhaust in a larger range than the preset high-load operation range above described.

Figure 6:
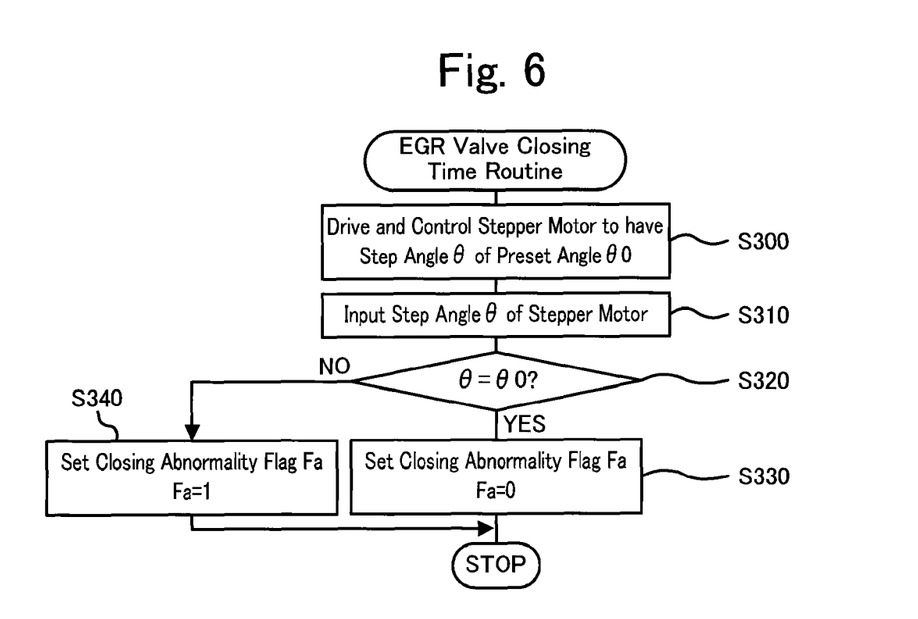
FIG. 6 is a flowchart showing an EGR valve closing time routine executed by the engine ECU 24 in the embodiment.

In the hybrid vehicle 20 of the embodiment, it is determined whether the step angle θ of the stepper motor 163 is equal to the preset angle θ0 which corresponds to the totally closed state of the EGR valve 164 before driving and controlling the stepper motor 163 to open the EGR valve 164, and the closing abnormality where the EGR valve 164 does not become in the totally closed state is accordingly detected. Instead, it may be determined whether the step angle θ of the stepper motor 163 is equal to the preset angle θ0 which corresponds to the totally closed state of the EGR valve 164 at the time of driving and controlling the stepper motor 163 to close the EGR valve 164, and the closing abnormality may be accordingly detected. FIG. 6 is a flowchart showing an EGR valve closing time routine executed by the engine ECU 24. In the EGR valve closing time routine, the CPU 24a drives and controls the stepper motor 163 so that the step angle θ of the stepper motor 163 becomes the preset angle θ0 (the stepper motor 163 becomes in the totally closed state) (step S300). The CPU 24a subsequently inputs the step angle θ of the stepper motor 163 from the step angle sensor 163a (step S310), and determines whether the input step angle θ of the stepper motor 163 is equal to the preset angle θ0 which corresponds to the totally closed state of the EGR valve 164 (step S320). When the step angle θ of the stepper motor 163 is equal to the preset angle θ0, the CPU 24a sets the abnormality detection flag Fa to value '0' (step S330). When the step angle θ of the stepper motor 163 is not equal to the preset angle θ0, the CPU 24a sets the abnormality detection flag Fa to value '1' (step S340). The CPU 24a then terminates the EGR valve closing time routine. In this case, the CPU 24a next may execute control to open the EGR valve 164 and execute the EGR execution time engine control routine of FIG. 4, and this arrangement then has the same effect as the embodiment.

In the hybrid vehicle 20 of the embodiment, it is determined whether the step angle θ of the stepper motor 163 input from the step angle sensor 163a is equal to the preset angle θ0 which corresponds to the totally closed state of the EGR valve 164, and the closing abnormality where the EGR valve 164 does not become in the totally closed state is accordingly detected. This is not essential. Any other arrangement may be applicable such as an arrangement of determining the EGR valve 164 is in the totally closed state, for example, an arrangement of detecting the closing abnormality based on any physical quantity (for example, the opening degree of the EGR valve 164) other than the step angle θ of the stepper motor 163.

Figure 7:
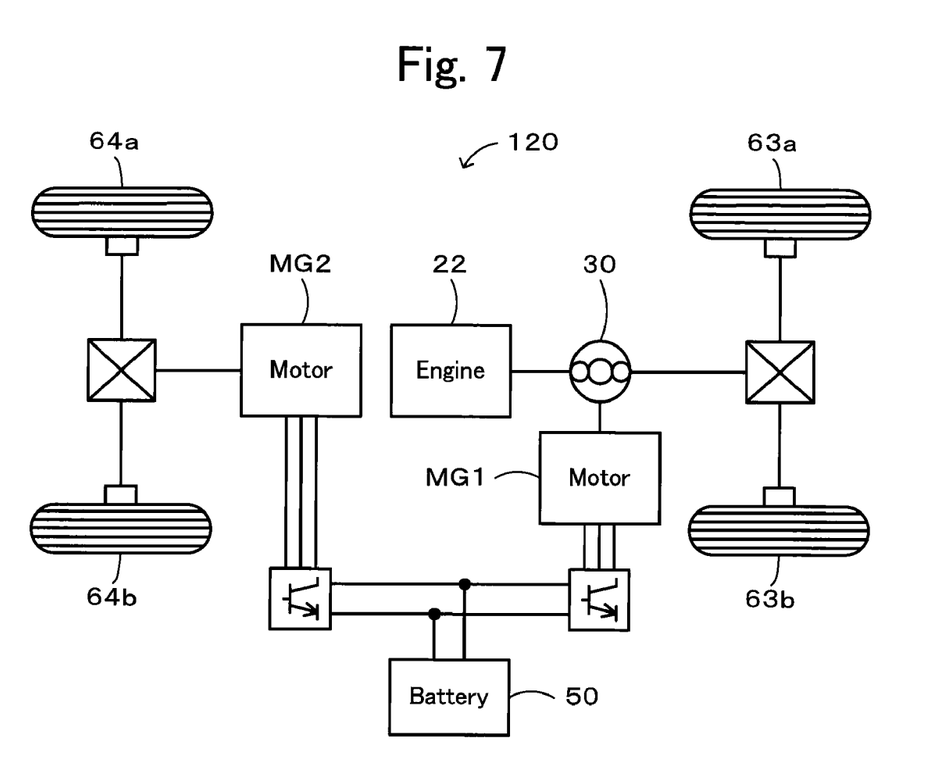
FIG. 7 schematically illustrates the configuration of another hybrid vehicle 120 in one modified example.

In the hybrid vehicle 20 of the embodiment, the power of the motor MG2 is converted by the reduction gear 35 and is output to the ring gear shaft 32a. The technique of the invention is also applicable to a hybrid vehicle 120 of a modified structure shown in FIG. 7. In the hybrid vehicle 120 of FIG. 7, the power of the motor MG2 is output to another axle (an axle linked with wheels 64a and 64b) that is different from the axle connecting with the ring gear shaft 32a (the axle linked with the drive wheels 63a and 63b).

In the above embodiment, the invention is applied to and explained using a hybrid vehicle driven with power from an engine and power from motors. The invention may be applied to an automobile having an engine as a driving power source, other than hybrid vehicles.

It is possible to perform the same control as the embodiment in what is equipped with an internal combustion engine system primarily having the engine 22, the EGR system 160, and the engine ECU 24. The principle of the invention may thus be actualized by an internal combustion engine system installed in diversity of other applications, for example, mobile bodies such as automobiles, other vehicles, boats and ships, and aircraft, and may also be installed in fixed equipments such as construction equipments. The principle of the invention may also be actualized by a control method of the internal combustion engine system.

The primary elements in the embodiment and its modified examples are mapped to the primary constituents in the claims of the invention as described below. The engine 22 in the embodiment corresponds to the 'internal combustion engine' in the claims of the invention. The EGR system 160 in the embodiment corresponds to the 'exhaust gas recirculation unit' in the claims of the invention. The catalytic converter 134 in the embodiment corresponds to the 'exhaust purification unit' in the claims of the invention. The engine ECU 24 executing the processing of step S110 through S130 in the EGR valve opening time routine of FIG. 3 to detect the closing abnormality when the step angle θ of the stepper motor 163 is not opened from the preset angle θ0 which corresponds to the totally closed state of the EGR valve 164 upon instruction to open the EGR valve 164 in the totally closed state corresponds to the 'closing abnormality detection module' in the claims of the invention. The engine ECU 24 executing the EGR execution time engine control routine of FIG. 4 to control the engine 22 using the set target fuel injection amount Qf* corresponds to the 'control module' in the claims of the invention. When the closing abnormality detection flag Fa is equal to value '0' (the closing abnormality where the EGR valve 164 does not become in the totally closed state is not detected) and the fuel increase determination flag Fi is equal to value '0' (the engine 22 is not operated in the preset high-load operation range where the purifying catalyst 134a has a possibility to be overheated), the basic fuel injection amount Qftmp is set as the target fuel injection amount Qf* during operation of the engine 22 with the recirculation of the exhaust gas. When the closing abnormality detection flag Fa is equal to value '0' and the fuel increase determination flag Fi is equal to value '1' (the engine 22 is operated in the preset high-load operation range where the purifying catalyst 134*a* has a possibility to be overheated), the product of the basic fuel injection amount Qftmp and the correction factor K (Qftmp·K) is set as the target fuel injection amount Qf* during operation of the engine 22 with the circulation of the exhaust gas. When the closing abnormality detection flag Fa is equal to value '1' (the closing abnormality is detected), the product of the basic fuel injection amount Qftmp and the correction factor K (Qftmp·K) is set as the target fuel injection amount Qf* during operation of the engine 22 with the circulation of the exhaust gas in the whole range that the engine 22 is operable together with the recirculation of the exhaust.

The 'internal combustion engine' is not restricted to the engine 22 designed to consume a hydrocarbon fuel, such as gasoline or light oil, and thereby output power, but may be an internal combustion engine of any other design, for example, a hydrogen engine. The 'exhaust gas recirculation unit' is not restricted to the EGR system 160 but may be any other unit including an exhaust regulating valve that regulates a recirculation amount of exhaust of the internal combustion engine into an intake system of the internal combustion engine and a valve driver that drives the exhaust regulating valve to be open and close. The 'exhaust purification unit' is not restricted to the catalytic converter 134 but may be any other unit including an exhaust purifying catalyst that purifies the exhaust of the internal combustion engine. The 'closing abnormality detection module' is not restricted to the arrangement of detecting the closing abnormality when the step angle θ of the stepper motor 163 is not opened from the preset angle θ0 which corresponds to the totally closed state of the EGR valve 164 upon instruction to open the EGR valve 164 in the totally closed state, but may be any other arrangement of detecting a closing abnormality that the exhaust regulating valve does not become in a totally closed state, for example, an arrangement of detecting the closing abnormality when the step angle θ of the stepper motor 163 is not the preset angle θ0 which corresponds to the totally closed state of the EGR valve 164 while driving and controlling the stepper motor 163 so that the step angle θ of the stepper motor 163 becomes the preset angle θ0. The 'control module' is not restricted to the arrangement of, when the closing abnormality where the EGR valve 164 does not become in the totally closed state is not detected and the engine 22 is not operated in the preset high-load operation range where the purifying catalyst 134*a* has a possibility to be overheated, setting the basic fuel injection amount Qftmp as the target fuel injection amount Qf* during operation of the engine 22 with the recirculation of the exhaust gas, when the closing abnormality is not detected and the engine 22 is operated in the preset high-load operation range where the purifying catalyst 134*a* has a possibility to be overheated, setting the product of the basic fuel injection amount Qftmp and the correction factor K (Qftmp·K) as the target fuel injection amount Qf* during operation of the engine 22 with the circulation of the exhaust gas, when the closing abnormality is detected, setting the product of the basic fuel injection amount Qftmp and the correction factor K (Qftmp·K) as the target fuel injection amount Qf* during operation of the engine 22 with the circulation of the exhaust gas in the whole range that the engine 22 is operable together with the recirculation of the exhaust, but may be any other arrangement of controlling the internal combustion engine, upon no detection of the closing abnormality by the closing abnormality detection module, so that the internal combustion engine is operated with fuel injection where a fuel increase is performed to prevent that the exhaust purifying catalyst is overheated, in a case that the internal combustion engine is operated together with recirculation of the exhaust in a high-load operation range that is a range of rotation speeds more than or equal to a preset rotation speed and torques more than or equal to a preset torque, upon detection of the closing abnormality by the closing abnormality detection module, controlling the internal combustion engine so that the internal combustion engine is operated with the fuel injection where the fuel increase is performed to prevent that the exhaust purifying catalyst is overheated, in a case that the internal combustion engine is operated together with the recirculation of the exhaust in a preset range that is a larger range than the high-load operation range.

The above mapping of the primary elements in the embodiment and its modified examples to the primary constituents in the claims of the invention is not restrictive in any sense but is only illustrative for concretely describing the modes of carrying out the invention. Namely the embodiment and its modified examples discussed above are to be considered in all aspects as illustrative and not restrictive.

There may be many other modifications, changes, and alterations without departing from the scope or spirit of the main characteristics of the present invention.

INDUSTRIAL APPLICABILITY

The technique of the invention is preferably applied to the manufacturing industries of the internal combustion engine systems and vehicles.

The invention claimed is:

1. A control method of an internal combustion engine system having an internal combustion engine, an exhaust gas recirculation unit including an exhaust regulating valve that regulates a recirculation amount of exhaust of the internal combustion engine into an intake system of the internal combustion engine and a valve driver that drives the exhaust regulating valve to be open and close, and an exhaust purification unit including an exhaust purifying catalyst that purifies the exhaust of the internal combustion engine, the control method of the internal combustion engine system comprising:

upon no occurrence of a closing abnormality that the exhaust regulating valve does not become in a totally closed state, controlling the internal combustion engine so that the internal combustion engine is operated with fuel injection where a fuel increase is performed to prevent that the exhaust purifying catalyst is overheated, in a case that the internal combustion engine is operated together with recirculation of the exhaust in a high-load operation range that is a range of rotation speeds more than or equal to a preset rotation speed and torques more than or equal to a preset torque, upon occurrence of the closing abnormality controlling the internal combustion engine so that the internal combustion engine is operated with the fuel injection where the fuel increase is performed to prevent that the exhaust purifying catalyst is overheated, in a case that the internal combustion engine is operated together with the recirculation of the exhaust in a preset range that is a larger range than the high-load operation range.

2. An internal combustion engine system having an internal combustion engine, an exhaust gas recirculation unit including an exhaust regulating valve that regulates a recirculation amount of exhaust of the internal combustion engine into an intake system of the internal combustion engine and a valve driver that drives the exhaust regulating valve to be open and close, and an exhaust purification unit including an exhaust purifying catalyst that purifies the exhaust of the internal combustion engine, the internal combustion engine system comprising:

a closing abnormality detection module that detects a closing abnormality that the exhaust regulating valve does not become in a totally closed state; and     a control module that controls the internal combustion engine, upon no detection of the closing abnormality by the closing abnormality detection module, so that the internal combustion engine is operated with fuel injection where a fuel increase is performed to prevent that the exhaust purifying catalyst is overheated, in a case that the internal combustion engine is operated together with recirculation of the exhaust in a high-load operation range that is a range of rotation speeds more than or equal to a preset rotation speed and torques more than or equal to a preset torque,     upon detection of the closing abnormality by the closing abnormality detection module, the control module controlling the internal combustion engine so that the internal combustion engine is operated with the fuel injection where the fuel increase is performed to prevent that the exhaust purifying catalyst is overheated, in a case that the internal combustion engine is operated together with the recirculation of the exhaust in a preset range that is a larger range than the high-load operation range.

3. The internal combustion engine system in accordance with claim 2, wherein the valve driver is a stepper motor, and     the closing abnormality detection module detects the closing abnormality when a step angle of the stepper motor is not a step angle corresponding to the totally closed state of the exhaust regulating valve regardless of an instruction to totally close the exhaust regulating valve, or when the step angle of the stepper motor is not opened more from the step angle corresponding to the totally closed state of the exhaust regulating valve regardless of an instruction to open the exhaust regulating valve from the totally closed state.

4. The internal combustion engine system in accordance with claim 2, wherein the preset range is a whole range that the internal combustion engine is operable while the internal combustion engine is operated together with the recirculation of the exhaust.

5. A vehicle having an internal combustion engine capable of outputting power for driving the vehicle, an exhaust gas recirculation unit including an exhaust regulating valve that regulates a recirculation amount of exhaust of the internal combustion engine into an intake system of the internal combustion engine and a valve driver that drives the exhaust regulating valve to be open and close, and an exhaust purification unit including an exhaust purifying catalyst that purifies the exhaust of the internal combustion engine, the vehicle comprising:

a closing abnormality detection module that detects a closing abnormality that the exhaust regulating valve does not become in a totally closed state; and     a control module that controls the internal combustion engine, upon no detection of the closing abnormality by the closing abnormality detection module, so that the internal combustion engine is operated with fuel injection where a fuel increase is performed to prevent that the exhaust purifying catalyst is overheated, in a case that the internal combustion engine is operated together with recirculation of the exhaust in a high-load operation range that is a range of rotation speeds more than or equal to a preset rotation speed and torques more than or equal to a preset torque,     upon detection of the closing abnormality by the closing abnormality detection module, the control module controlling the internal combustion engine so that the internal combustion engine is operated with the fuel injection where the fuel increase is performed to prevent that the exhaust purifying catalyst is overheated, in a case that the internal combustion engine is operated together with the recirculation of the exhaust in a preset range that is a larger range than the high-load operation range.

6. The vehicle in accordance with claim 5, wherein the valve driver is a stepper motor, and     the closing abnormality detection module detects the closing abnormality when a step angle of the stepper motor is not a step angle corresponding to the totally closed state of the exhaust regulating valve regardless of an instruction to totally close the exhaust regulating valve, or when the step angle of the stepper motor is not opened more from the step angle corresponding to the totally closed state of the exhaust regulating valve regardless of an instruction to open the exhaust regulating valve from the totally closed state.

7. The vehicle in accordance with claim 5, wherein the preset range is a whole range that the internal combustion engine is operable while the internal combustion engine is operated together with the recirculation of the exhaust.

\* \* \* \* \*

UNITED STATES PATENT AND TRADEMARK OFFICE
CERTIFICATE OF CORRECTION

PATENT NO. : 7,949,462 B2
APPLICATION NO. : 12/988970
DATED : May 24, 2011
INVENTOR(S) : Hikikazu Akimoto It is certified that error appears in the above-identified patent and that said Letters Patent is hereby corrected as shown below:

| Column | Line  |                                                              |
|--------|-------|--------------------------------------------------------------|
| 14     | 37    | Change "to be open and close" to --to be opened and closed--. |
| 14     | 66-67 | Change "to be open and close" to --to be opened and closed--. |
| 16     | 3     | Change "to be open and close" to --to be opened and closed--. |

Signed and Sealed this
Thirteenth Day of December, 2011

David J. Kappos
*Director of the United States Patent and Trademark Office*